US 6,570,976 B2

(12) United States Patent
Asada et al.

(10) Patent No.: US 6,570,976 B2
(45) Date of Patent: May 27, 2003

(54) MULTIMEDIA PRIVATE BRANCH EXCHANGER AND PRIVATE BRANCH EXCHANGE SYSTEM

(75) Inventors: Hiroshi Asada, Tokyo (JP); Yasuo Funato, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/226,719

(22) Filed: Jan. 7, 1999

(65) Prior Publication Data

US 2002/0015487 A1 Feb. 7, 2002

(30) Foreign Application Priority Data

Jan. 8, 1998 (JP) ............................. 10-002415

(51) Int. Cl.⁷ .................... H04M 7/00; H04M 1/00; G01R 31/08
(52) U.S. Cl. ............... 379/221.01; 379/156; 379/32.01; 379/279; 370/242
(58) Field of Search ................ 379/265.01–265.14, 379/225, 201.01–201.12, 207.01–207.16, 219, 266.01–266.1, 309, 32.01–32.05, 156, 176, 164, 279, 220.01, 221.01; 370/242, 250

(56) References Cited

U.S. PATENT DOCUMENTS

| 5,289,524 A | * | 2/1994 | Takano et al. ............... 379/57 |
| 5,706,338 A | * | 1/1998 | Relyea et al. ............... 379/189 |
| 5,715,304 A | * | 2/1998 | Nishida et al. ............. 379/114 |
| 5,784,381 A | * | 7/1998 | Hori ........................... 370/509 |
| 5,894,512 A | * | 4/1999 | Zenner ....................... 379/265 |
| 5,991,391 A | * | 11/1999 | Miloslavsky ............... 379/265 |
| 6,002,665 A | * | 12/1999 | Choe ........................... 370/217 |
| 6,038,302 A | * | 3/2000 | Burok et al. ................ 379/201 |
| 6,046,762 A | * | 4/2000 | Sonesh et al. ............... 348/16 |
| 6,154,465 A | * | 11/2000 | Pickett ....................... 370/466 |

FOREIGN PATENT DOCUMENTS

| JP | 56-123014 | 9/1981 |
| JP | 60-149251 | 8/1985 |
| JP | 61-055750 | 3/1986 |
| JP | 62-048846 | 3/1987 |
| JP | 03-101465 | 4/1991 |
| JP | 03-105429 | 5/1991 |
| JP | 03-269609 | 12/1991 |
| JP | 04-334252 | 11/1992 |
| JP | 06-177964 | 6/1994 |
| JP | 07-023104 | 1/1995 |
| JP | 08-163275 | 6/1996 |
| JP | 09-130429 | 5/1997 |
| JP | 09-284393 | 10/1997 |

OTHER PUBLICATIONS

Japanese Patent Office: Notification of Reasons for Rejection dated Jun. 18, 2002.

* cited by examiner

*Primary Examiner*—Benny Q. Tieu
(74) *Attorney, Agent, or Firm*—Finnegan, Henderson, Farabow, Garrett & Dunner, L.L.P.

(57) ABSTRACT

The router unit is built in the main key telephone apparatus, the office line interface function and the independent power supplying function are deleted in the router unit, and the office line interface units and the power supply unit substitute for these functions. The temperature inside the cabinet, the operated state of the cooling fan, and the temperature and operating power supply voltage Vcc of the PC power supply unit, etc. are detected in the CTI personal computer, and these monitor data are transferred to the main key telephone apparatus and analyzed in the main key telephone apparatus, so as to detect abnormality in the CTI personal computer and take necessary measures against the abnormality.

16 Claims, 12 Drawing Sheets

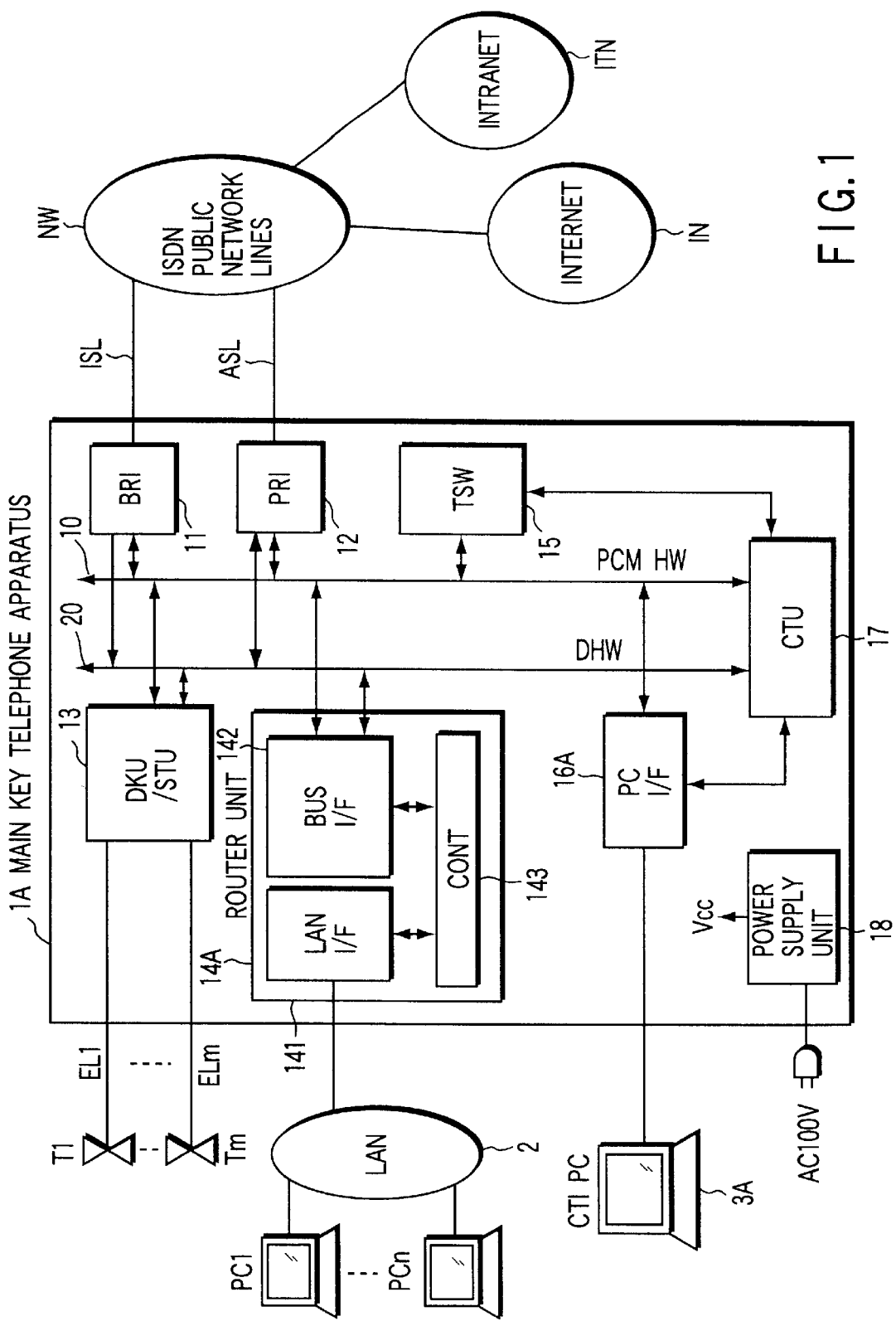
F I G. 1

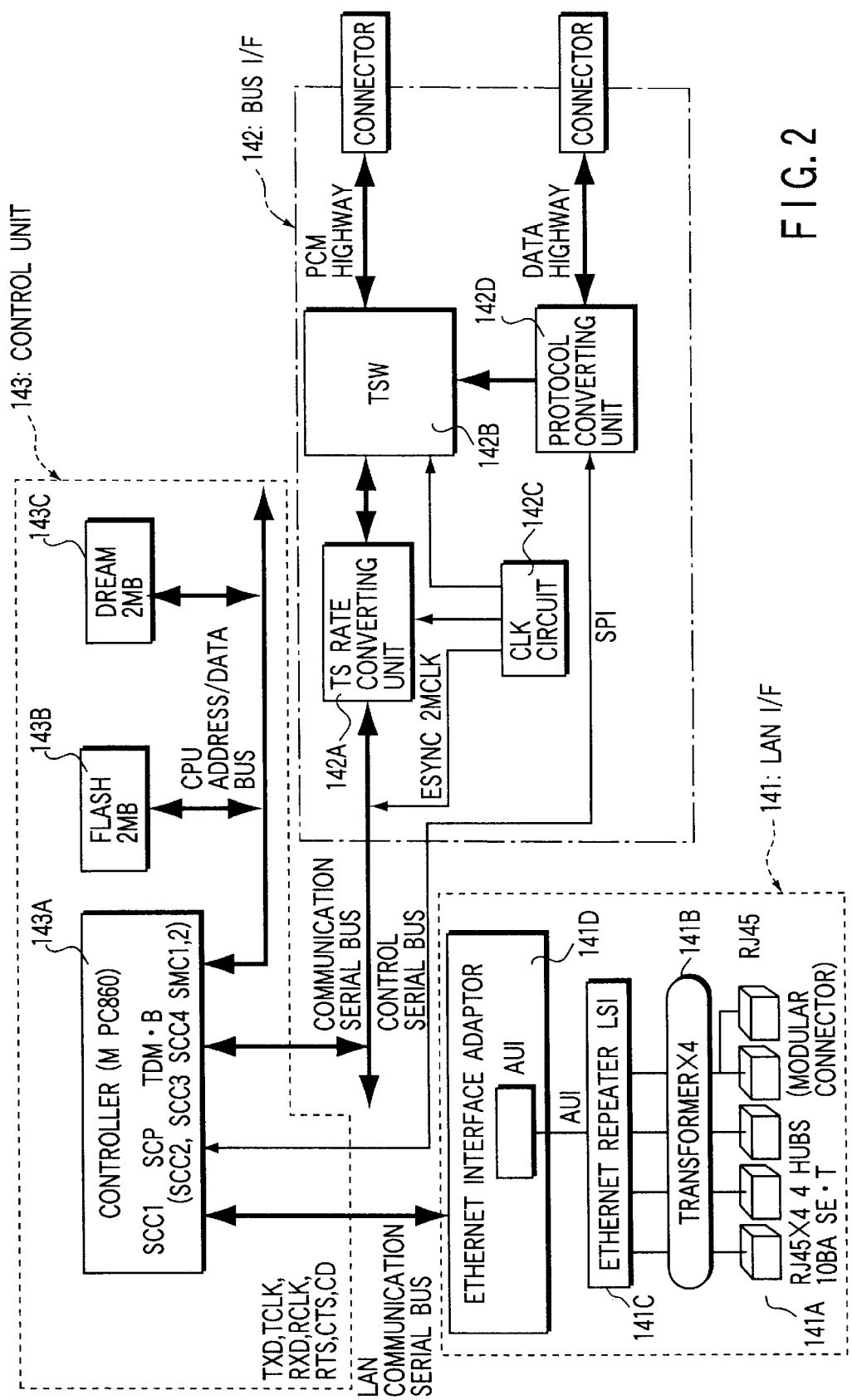
F I G. 2

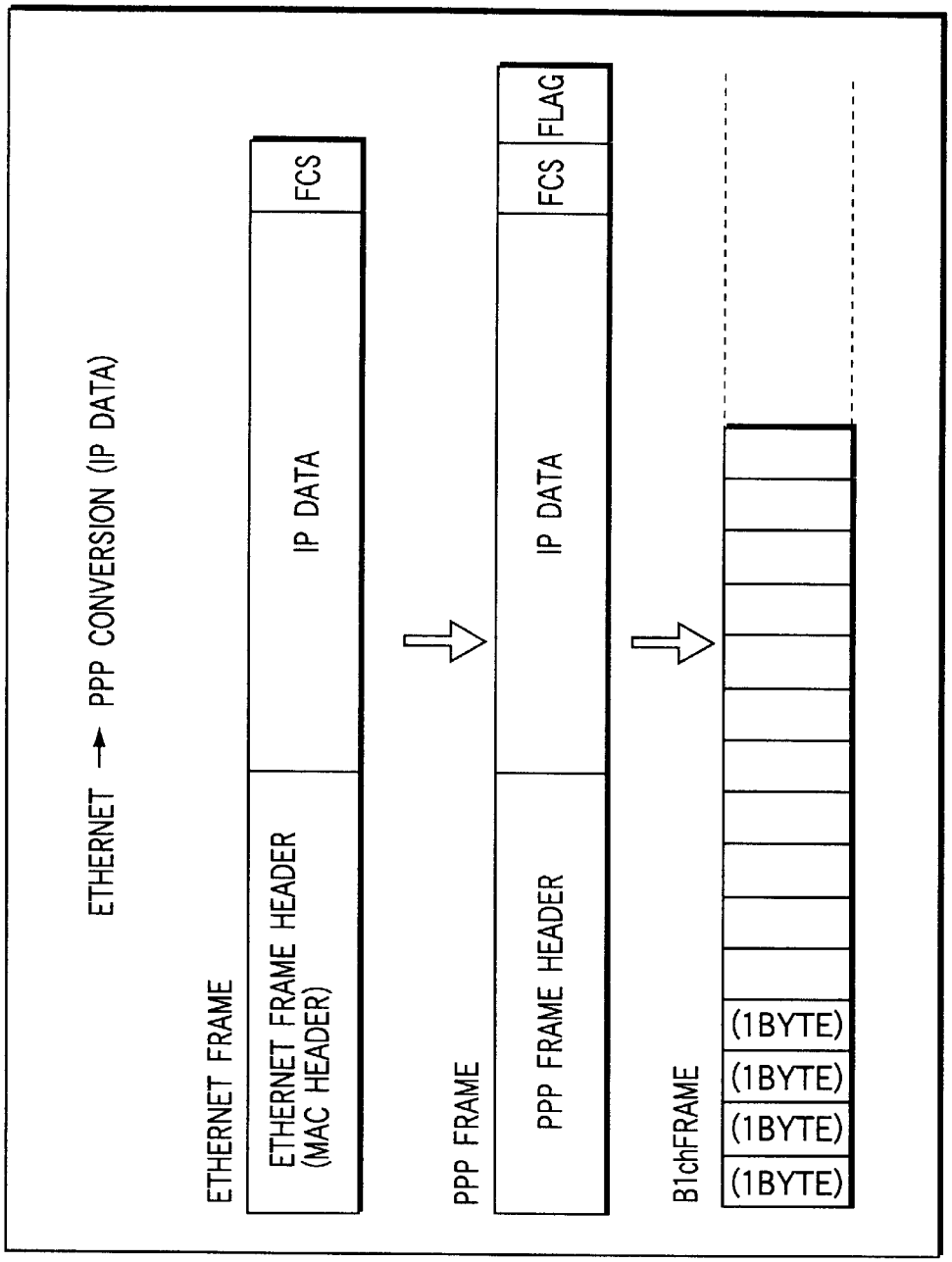
F I G. 3A

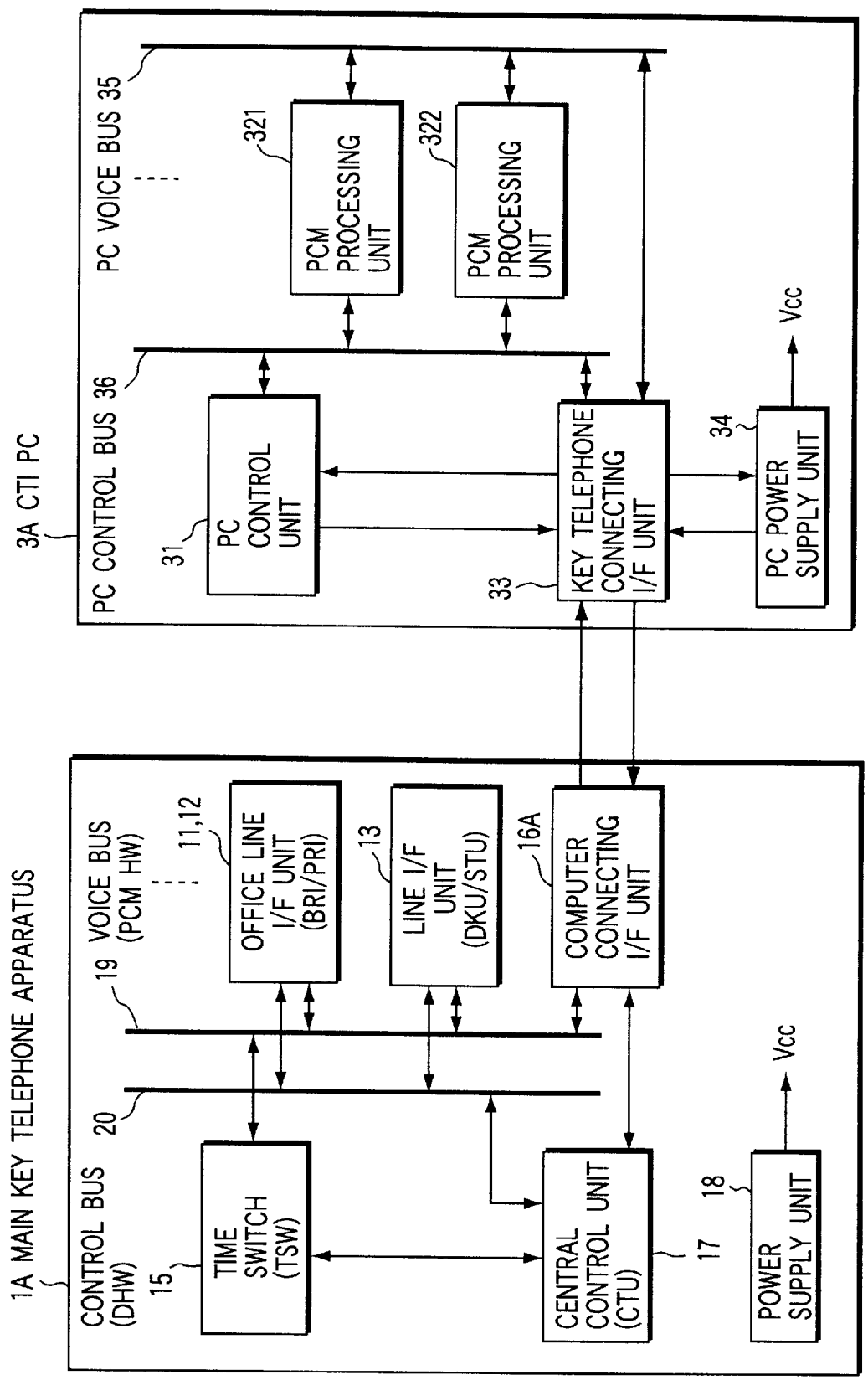
F I G. 4

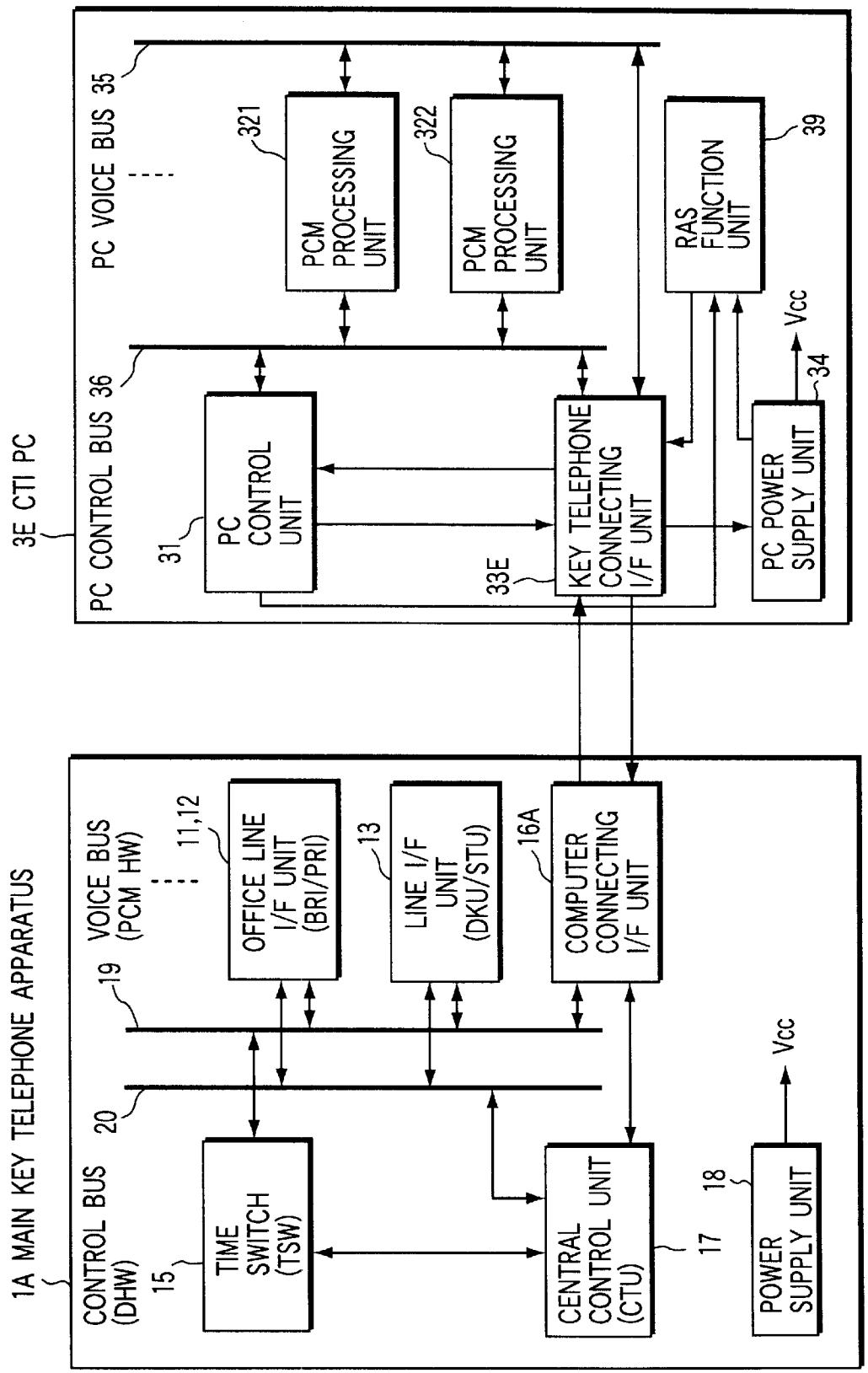
F I G. 9

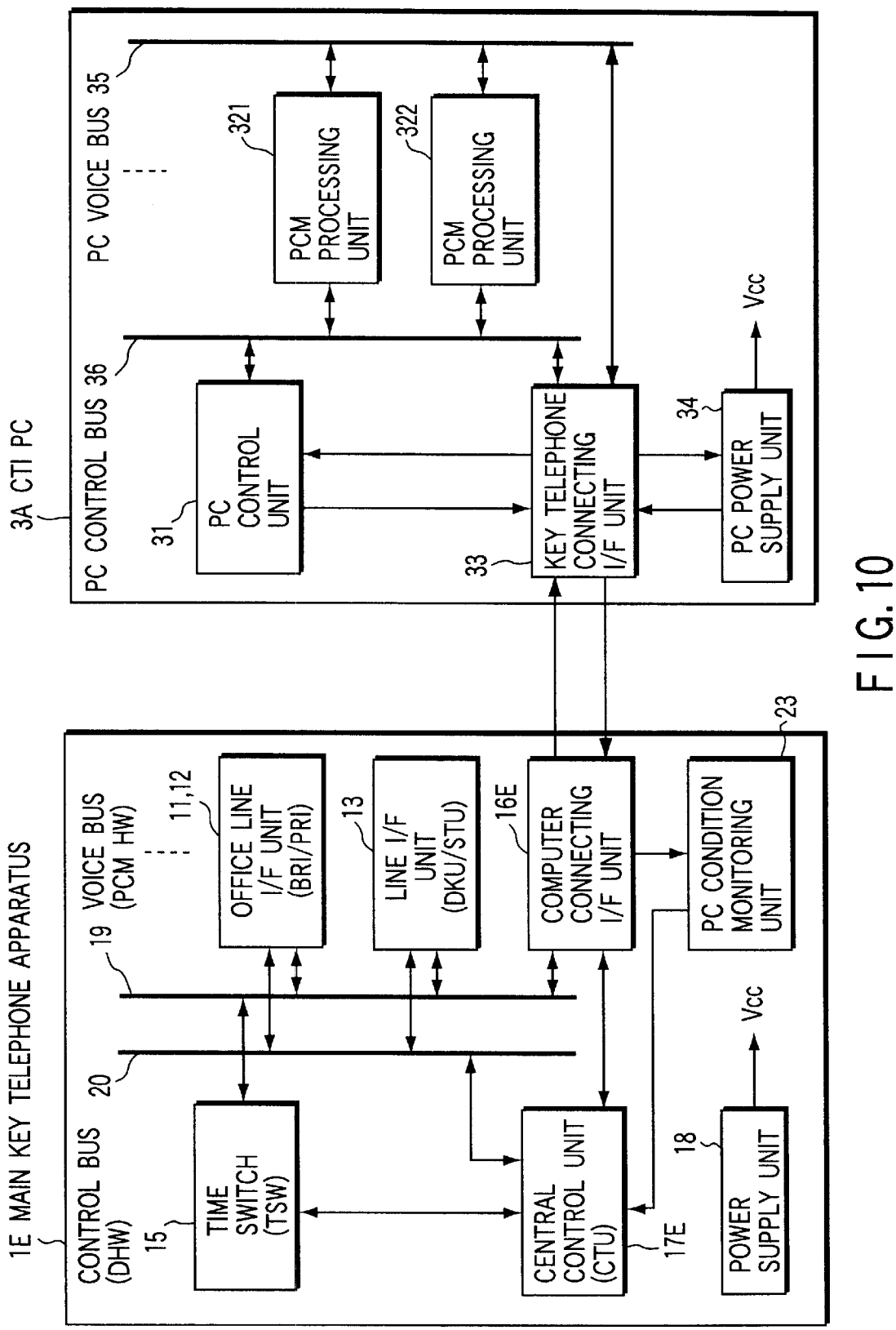
F I G. 10

MULTIMEDIA PRIVATE BRANCH EXCHANGER AND PRIVATE BRANCH EXCHANGE SYSTEM

BACKGROUND OF THE INVENTION

The present invention relates to a private branch exchange system such as a key telephone system, and particularly to a multimedia private branch exchanger capable of handling video signals, computer data and the like as well as voice signals and a private branch exchange system employing CTI (Computer Telephony Integration).

Many key telephone systems have been employed in office buildings and company offices. Recently, as an extension-type system thereof, a multimedia-applicable key telephone system has been proposed, which processes not only voice signals at telephone terminals, but also video signals and computer data at videophone terminals and personal computers.

However, in a conventional system of this kind, for example, a standalone router is provided separately from a main key telephone apparatus so that a data terminal connected to a LAN (Local Area Network) is connected to the main key telephone apparatus via the standalone router. Therefore, the standalone router and an interface unit dedicated for the main device need to be prepared for connection to the LAN, which increases the user's economic burden.

On the other hand, employment of a CTI (Computer Telephony Integration) has been reviewed for constitution of the key telephone system. The CTI allows the main key telephone apparatus to be connected to a server computer or personal computers, and the computers to process the parts of the exchange of the main key telephone apparatus and storage and working of the voices and data, etc. The CTI can realize a high-performance system without enhancing the processing performance of the main key telephone apparatus.

Generally, the main key telephone apparatus is designed with high reliability so as to be operated under the unmanned control for a long time. However, since a cheap widely used computer such as a personal computer is used as the CTI computer of the key telephone system, it can be well expected that the CTI computer may often lapse into an uncontrollable state such as malfunction, or abnormality may occur in an air-cooling fan, a hard disc, a power supply, etc. In these cases, if a maintenance person or an operator is stationed near the CTI computer, he can immediately finish the malfunction program and restart the operation of the computer, or stop the CTI computer to disconnect it from the main key telephone apparatus. Generally, however, a maintenance person or an operator is not stationed. If the CTI computer is abnormally operated, the processing ability of the system is not only lowered, but also the abnormality in the CTI computer influences the main key telephone apparatus, which may cause the system down. Therefore, effective measures against such operational abnormality have been expected.

The conventional multimedia-applicable key telephone system described above has a problem that the router dedicated for accommodation of the LAN and the interface unit dedicated for the main device need to be installed and thereby the manufacturing cost of the system may be increased.

In addition, in a case where the router is a general dial-up router, there are problems that (1) a new ISDN line other than the main key telephone apparatus needs to be drawn or an ISDN extension line interface unit dedicated for the key telephone need to be prepared; and (2) when the battery at the power failure is backed up, an uninterruptible power supply UPS needs to be prepared to enhance reliability.

Further, when the CTI is carried out, there is also a problem that solutions to the operational abnormality of the computer have not been established.

BRIEF SUMMARY OF THE INVENTION

The present invention has been accomplished by considering the above-described circumstances, and its first object is to provide a multimedia private branch exchanger which can accommodate the LAN while restricting the manufacturing costs of the system as much as possible.

The second object of the present invention is to provide a private branch exchange system which can effectively respond to abnormality in operations of the CTI computer.

In order to achieve the first object, there is provided a multimedia private branch exchanger, comprising: a line interface unit having a function of controlling communication with extension line telephone terminals; a router unit having a function of controlling communication with data terminals to be connected to the local area network; an office line interface unit provided commonly to the line interface unit and the router unit, and having a function of controlling communication with an external communication network; and a switching unit for selectively connecting the line interface unit and the router unit to the office line interface unit, on the basis of a request for setting a call.

The present invention has also a characteristic of comprising a power supply unit provided commonly to the line interface unit, the router unit, the office line interface unit and the switching unit, and supplying the power necessary for their respective operations from the power supply unit to each of the units.

That is, in the present invention, the router unit for connection of the local area network is built in the exchanger, this router unit has the only interface function with the local area network, and the office line interface unit and the power supply unit which have been provided in the exchanger are used as the office line interface unit and the power supply unit provided normally in a general dial-up router.

Therefore, according to the present invention, the standalone router or the general dial-up router does not need to be provided separately from the exchanger. In addition, the router unit of the present invention is not only built in the exchanger, but also the office line interface function and the power supply unit which have been provided in the exchanger are commonly used as the office line interface unit and the power supply unit which are to be provided in the router unit. As a result, a system which is of high reliability, a comparatively small size and low manufacturing costs, can be provided.

The present invention has also a characteristic of comprising, in the router unit, a protocol converting unit for connecting the data terminals directly connected to the LAN, to the office line interface within the exchanger. In this structure, when a plurality of data terminals are connected to the local area network, the entire data transfer between the data terminals and the respective unit in the exchanger can be subjected to the interface process in the router unit. As a result, the function of the interface with the exchanger does not need to be provided at each of the data terminals and thereby the burden on the data terminal users can be reduced.

Further, the present invention has also a characteristic of comprising a hub in the router unit and connecting a plurality of local area networks or data terminal devices via the hub.

On the other hand, in order to achieve the second object described above, there is provided a private branch exchange system, comprising an exchanger for accommodating a plurality of extension lines and at least one office line and having various functions concerning exchange between the extension lines or between the extension liens and the office line; and a CTI computer for carrying out part of the functions of the exchanger, and the system comprises, in the CTI computer, means for monitoring abnormality in its own device, and means for informing the exchanger of abnormality monitor results obtained by the abnormality monitoring means, and also comprises, in the exchanger, means for receiving the abnormality monitor results from the CTI computer, means for discriminating abnormality on the basis of the abnormality monitor results received by the abnormality receiving means, and abnormality response means for optionally disconnecting the CTI computer from its own device on the basis of discrimination results of the abnormality discriminating means.

The abnormality monitoring means monitors at least one of abnormality in a temperature inside the CTI computer, abnormality in the power supply, abnormality in operations of a cooling device and abnormality in operations of the computer.

Therefore, according to the present invention, when abnormal rise of the temperature, abnormality in the power supply, operational abnormality in the cooler, or operational abnormality in operations of the program occurs in the CTI computer, results of the detection are informed from the CTI computer to the exchanger. In response to this information, the abnormal state is discriminated by the exchanger. If there is a danger of malfunction in the CTI computer, the CTI computer is disconnected. As a result, the operational abnormality in the CTI computer does not influence the exchanger and thereby the system down can be preliminarily prevented.

Moreover, the present invention has also a characteristic of further comprising, in the CTI computer, means for monitoring recovering conditions of its own device from the abnormality, and means for informing the exchanger of the recovery results monitored by the recovery monitoring means; and further comprising, in the exchanger, means for receiving recovery monitor results from the CTI computer, means for discriminating recovering conditions on the basis of the recovery monitor results received by the recovery receiving means, and means for restoring the connection with the CTI computer on the basis of the discrimination results of the recovery discriminating means.

According to the present invention, when the CTI computer is recovered from the operational abnormality, the connection between the exchanger and the CTI computer is automatically restored. Therefore, for example, when the CTI computer, which is abnormally operated temporarily, returns to the normal condition, or when the CTI computer returns to the normal condition after the parts of the CTI computer are exchanged, the connection between the exchanger and the CTI computer can be restored without waiting for the restoring operation to be made by a maintenance person.

Furthermore, the present invention has also a characteristic of allowing the exchanger to inquire the CTI computer about operated conditions of the CTI computer; and compulsorily resetting the CTI computer when a predetermined response to the inquiry is not sent from the CTI computer to the exchanger, for example when no response or abnormal command is returned.

Therefore, even when the CTI computer cannot be restored by its own self, for example, when there is malfunction in the program of the CTI computer, the CTI computer can be reset by the exchanger and the operated state of the CTI computer can be restored to the normal condition.

In addition, as described above, when the cooler is broken, abnormality occurs in the power supply, or there is malfunction in the program, in the CTI computer, the information indicative of the abnormal condition may be transferred from the exchanger to the extension line terminals or a relay station and, for example, the information may be displayed on a LCD or voice messages may be made so as to inform the user or a relay station operator of the information. Thus, the user or the relay station operator can immediately understand that there has been operational abnormality or malfunction in the program, in the CTI computer, and can thereby quickly take measures such as the restoring operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit block diagram illustrating a first embodiment of a digital key telephone system according to the present invention;

FIG. 2 is a circuit block diagram illustrating the router unit 14A of FIG. 1 in more detail;

FIGS. 3A and 3B show the conversion from IP data signal to PPP protocol format;

FIG. 4 is a circuit block diagram illustrating essential units of the system shown in FIG. 1;

FIG. 9 is a block diagram illustrating essential units of a fourth embodiment of the digital key telephone system according to the present invention;

FIG. 10 is a block diagram illustrating essential units of a fifth embodiment of the digital key telephone system according to the present invention.

Figure 3B:
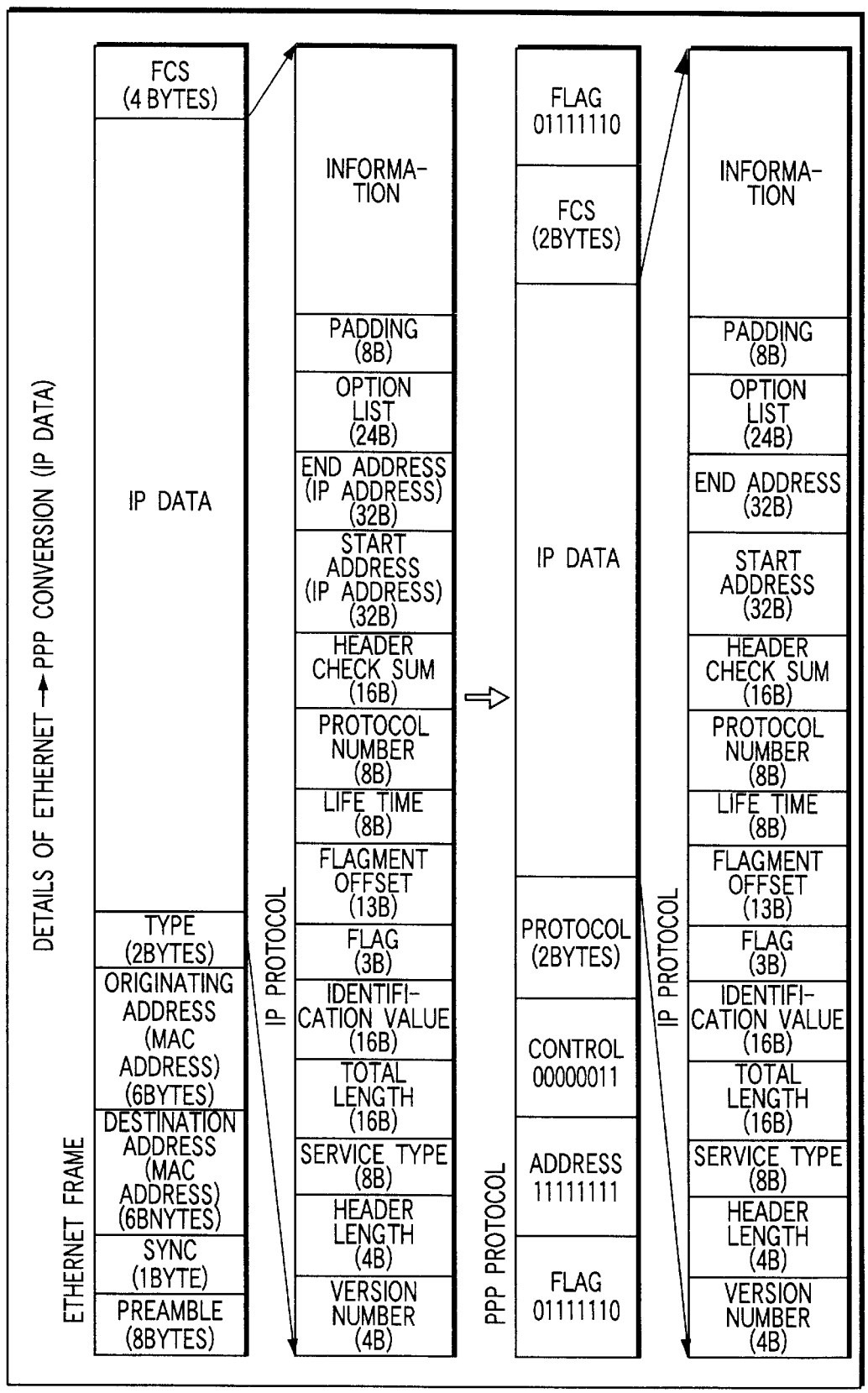

DETAILED DESCRIPTION OF THE INVENTION (First Embodiment)

FIG. 1 is a block diagram illustrating an embodiment of a multimedia key telephone system according to the present invention in which 1A represents a main key telephone apparatus at the core of this system.

The main key telephone apparatus 1A comprises plural kinds of office line interface units (a basic rate interface: BRI, a primary rate interface: PRI) 11 and 12, a line interface unit (a digital key telephone unit/standard telephone unit: DKU/STU) 13, a time switch unit (TSW) 15, and a central control unit (CTU) 17. These are mutually connected via a voice bus (pulse code modulation highway: PCMHW) 19 and a control bus (data highway: DHW) 20.

The office line interface unit (BRI) 11 is connected to an ISDN public network NW via a subscriber line ISL corresponding to the ISDN basic interface, for example to control establishment of a call with the ISDN public network NW on the basis of the basic interface. The office line interface unit (PRI) 12 is connected to the ISDN public network NW via a subscriber line ASL corresponding to an ISDN primary rate interface, for example to control establishment of a call with the ISDN public network NW on the basis of the primary rate interface.

The line interface unit 13 accommodates a plurality of extension lines EL1 to ELm, which are connected respectively to extension line terminals T1 to Tm. Digital key telephones, analog telephones and facsimile devices are, for example, used as the extension line terminals T1 to Tm. The digital key telephone is connected to the DKU, and the analog terminal such as the analog telephone or facsimile device is connected to the STU. The DKU processes the transmission and reception with the digital key telephone and the transfer of a digital signal. The STU processes the transmission and reception with the analog terminal and the analog/digital conversion of the signal.

The time switch unit 15 switches the channels of the digital signal transmitted between the office line interface units 11 and 12, and the line interface unit 13 via the voice bus 19 in accordance with instructions of the central control unit 17. 18 denotes a power supply unit, which generates a desired DC power supply voltage Vcc on the basis of the commercial power supply output (AC100V) and supplies the DC power supply voltage Vcc to all the circuit units in the device including a router unit described later.

Incidentally, a router unit 14A and a computer-connecting interface unit (PC I/F) 16A are built in the main key telephone apparatus 1A of the first embodiment. The router unit 14A is constituted by a LAN interface unit (LAN I/F) 141, a bus interface unit (bus I/F) 142 including a protocol converting unit and a control unit (CONT) 143. That is, in the router unit 14A, ISDN interface functions and a power supply unit of a generally used dial-up router are deleted and the bus I/F 142 including the converting unit having a protocol converting function to connect a LAN 2 directly to the voice bus 19 and the control bus 20 inside the main key telephone apparatus 1A is provided.

FIG. 2 shows the router unit 14A of FIG. 1 in more detail.

This router unit 14A is a circuit on a single card board and can be detached from the main key telephone apparatus 1A. The router card (i.e. the router unit) is constituted as explained below. Therefore, if the user does not need the router function of the main key telephone apparatus 1A, he can detach the router card from the main key telephone apparatus 1A and, instead, connect an extension line telephone interface card having an extension line circuit or a trunk card having a trunk circuit.

The router unit 14A is constituted by the LAN interface unit (LAN I/F) 141, the bus interface unit (bus I/F) 142 and the control unit 143 as described above.

The LAN interface unit (LAN I/F) 141 includes a modular 141A for making connection to an external LAN, transformers 141B for insulating the interior of the unit, an Ethernet repeater 141C serving as a hub for splitting one port to four ports, and an Ethernet interface adapter 141D for processing Manchester code conversion and a differential output and a differential input of signals.

The control unit 143 includes a controller 143A, a flash memory (a program memory) 143B, and a data memory (DRAM) 143C. The controller 143A processes various kinds of controls on the basis of programs stored in the program memory 143B, such as, for example, analysis of MAC addresses and IP addresses transmitted from the Ethernet interface adapter 143D.

In addition, the control unit 143 has a PPP (point to point protocol) connecting function, which allows data terminals PC1–PCn connected to the LAN to be connected to the Internet IN and the intranet ITN via the ISDN public network NW. The control unit 143, which also has a routing table at the flash memory 143B, carries out the routing process of packets transmitted between the data terminals PC1–PCn and the ISDN public network NW, by referring to the routing table.

The bus interface unit (bus I/F) 142 includes a TS rate converting unit 142A, a time switch (TSW) 142B, a CLK circuit 142C for generating a clock signal for the TS rate converting unit 142A and the time switch 142B, and a protocol converting unit 142D.

The time switch 142B is connected to a connector for connecting it to a PCM highway 19 of the main key telephone apparatus 1A, and the protocol converting unit 142D is connected to a connector for connecting it to a data highway 20 of the main key telephone apparatus 18.

The time switch 142B and the TS rate converting unit 142A serve as a time slot assignor, which processes conversion between a protocol of an ISDN layer 3 to be generated in the control unit 142 and a protocol of an extension line control interface layer 3 of the main key telephone apparatus 1A, in order to transmit the data transmitted from the LAN via the ISDN.

Specifically, a protocol signal of the layer 3 to be transmitted from the controller 143A of the control unit 143 via the control serial bus and used for connection of the ISDN line conversion/I.430 line is converted into the protocol of the internal control interface layer 3, and then transmitted in transmission format mode of the data highway 20.

Next, an operation of the router unit 14A will be described.

The IP data having the MAC header transmitted from the LAN is received by the LAN interface unit 141.

Specifically, the interior of the LAN interface unit 141 is insulated by the transformer 141B, and the IP data is input to the Ethernet repeater LSI 141C and then input to the controller 143A of the control unit 143 via the Ethernet interface adapter LSI 141D.

In the controller 143A, after the IP data signal is converted into the PPP protocol format, it is transmitted to the TS rate converting unit 142A of the bus I/F 142 with a B channel signal of the ISDN via the communication serial bus. The conversion from IP data signal to PPP protocal format is shown in FIGS. 3A and 3B. The IP data signal is also transmitted to the protocol converting unit 142D of the bus I/F unit 142 with a D channel signal of the ISDN via the communication address bus corresponding to the ISDN line conversion I.430 protocol.

In the bus interface unit 142, the time slot conversion is carried out by the TS rate converting unit 142A and the time switch (TSW) 142B, so that the B channel signal transmitted from the controller 143A is input to a PCM highway's own time slot and the D channel signal from the protocol converting unit 142D is input to a data highway's own time slot. The "own time slot" is a time slot determined on the basis of a position where the router card is accommodated.

A CTI personal computer (CTI PC) 3A is connected to the computer-connecting interface unit 16A. The computer-connecting interface unit 16A has a function of transferring a digital voice signal between the CTI personal computer 3A and the voice bus 19, and a function of transferring a control command and the like between the central control unit 17 and the CTI personal computer 3A.

FIG. 4 is a schematic diagram illustrating the connection between the CTI personal computer 3A and the main key telephone apparatus 1A. The CTI personal computer 3A comprises a PC control unit 31 having a micro-computer as a main controller, a plurality of PCM processing units 321, 322, . . . , a key telephone connecting interface unit 33 and a PC power supply unit 34. The PC control unit 31, PCM processing units 321, 322, . . . , and key telephone connecting interface unit 33 are connected via a PC voice bus 35 and a PC control bus 36.

The PCM processing units 321, 322, . . . execute various processes necessary for the CTI, such as compression and encoding or extension and decoding of the digital voice signal transmitted from the main key telephone apparatus 1A, synthesis of the voice, detection of a DTMF signal, processing of a facsimile signal, processing of a modem signal, and the like.

Figure 5:
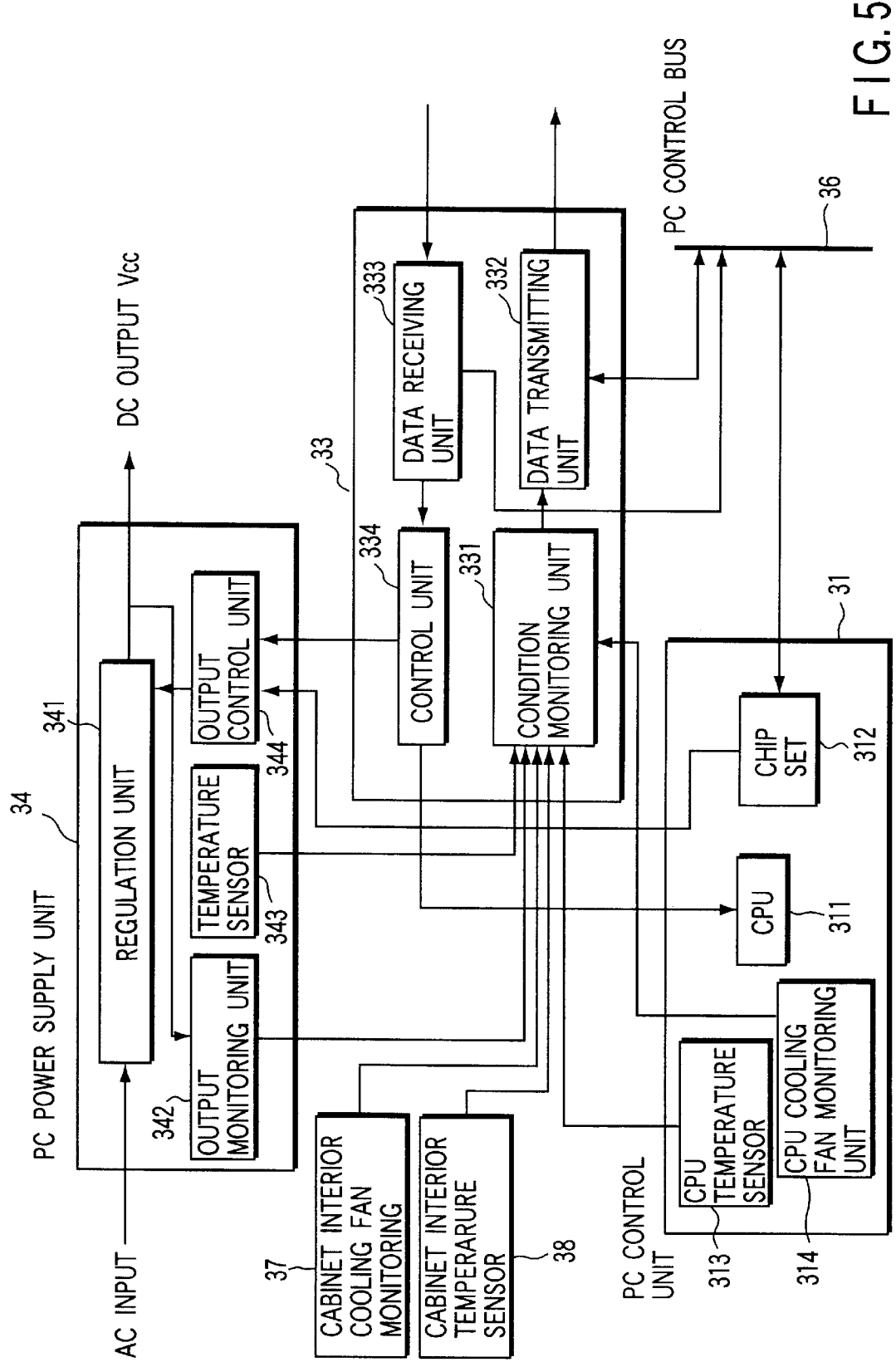
FIG. 5 is a circuit block diagram illustrating the structure of a CTI personal computer shown in FIG. 4.

On the other hand, the PC control unit 31, the key telephone connecting interface unit 33 and the PC power supply unit 34 are constituted as follows. FIG. 5 is a circuit block diagram illustrating their structures. A cabinet interior cooling fan monitoring unit 37 and a cabinet interior temperature sensor 38 are provided in the CTI personal computer 3A. The cabinet interior cooling fan monitoring unit 37 monitors the operated state of a cooling fan and outputs the monitoring information. The cabinet interior temperature sensor 38 outputs temperature detection information representing the temperature inside the cabinet.

The PC power supply unit 34 comprises a regulation unit 341, an output monitoring unit 342, a temperature sensor 343 and an output control unit 344. The regulation unit 341 generates a desired operating power supply voltage Vcc on the basis of the commercial power supply output and supplies it to each unit inside the CTI personal computer 3A. The output monitoring unit 342 monitors the value of the operating power supply voltage Vcc and outputs the monitoring information. The temperature sensor 343 detects the temperature in the PC power supply unit 34 and outputs the information about the detection of temperature. The output control unit 344 controls operations of the regulation unit 341 in accordance with the instructions from the PC control unit 31 described later.

The PC control unit 31 comprises a CPU 311, a chip set 312, a CPU temperature sensor 313 and a CPU cooling fan monitoring unit 314. The CPU 311, which totally controls the operations of the personal computer 3A, executes transmission and reception of the control signal via the chip set 312. The CPU temperature sensor 313 monitors the temperature of the CPU and outputs the information about the detection. The CPU cooling fan monitoring unit 314 monitors the operated state of the CPU cooling fan and outputs the monitoring information.

The key telephone connecting interface unit 33 has a data transmitting unit 332, a data receiving unit 333 and a control unit 334, and executes the transfer of a digital voice signal and the control data with the computer connecting interface unit 16A of the main key telephone apparatus 1A. In addition, a condition monitoring unit 331 is provided in the key telephone connecting interface unit 33. The condition monitoring unit 331 takes and stores the monitoring information of the cabinet interior cooling fan monitoring unit 37, the temperature detection information of the cabinet interior temperature sensor 38, the monitoring information of the operating power supply voltage Vcc, the temperate detection information of the temperature sensor 343 in the PC power supply unit 34, the temperate detection information of the CPU temperature sensor 313 and the monitoring information of the CPU cooling fan monitoring unit 314. Every time a request for transmission of the monitoring data comes from, for example, the main key telephone apparatus 1A, the latest monitoring information is transmitted from the data transmitting unit 332 to the main key telephone apparatus 1A as the condition monitoring data.

The central control unit 17 of the main key telephone apparatus 1A has a function of discriminating abnormality in the CTI personal computer 3A, a function of displaying and controlling abnormality and a function of responding to and controlling abnormality.

The abnormality discriminating function transmits a request for transmission of the monitoring data to the CTI personal computer 3A at a constant interval, and receives the condition monitoring data that is transmitted from the CTI personal computer 3A in response to the request. Then, the function discriminates, on the basis of the received condition monitoring data, whether there is abnormality of the power supply voltage value Vcc or abnormality of the cooling fan, or whether or not the temperature rises abnormally, in the CTI personal computer 3A. If the various abnormalities are detected by this function, the abnormality displaying and controlling function transmits the display data representing the detected abnormal condition to a specific key telephone or a relay station and allows the display data to be displayed.

If an order to stop the operation or an order to restart is input from the specified key telephone as a result of detecting any one of the abnormality in the power supply voltage value Vcc, abnormality in the cooling fan and the abnormal temperature rise by the abnormality discriminating function, the abnormality response and control function executes any one of the following three operations: (1) to transmit an order to the CTI personal computer 3A to stop its operations; (2) to transmit an order to the CTI personal computer 3A to restart its operations; and (3) to transmit an order to the output control unit 344 to stop the output of the PC power supply unit 34 and stop the operations of the CTI personal computer 3A.

The central control unit 17 of the main key telephone apparatus 1A also has a function of monitoring and responding to the recover of the CTI personal computer 3A. This function periodically monitors the operated state of the CTI personal computer 3A and discriminates whether or not the operated state thereof is recovered, when the operations of the CTI personal computer 3A are stopped. If the function detects that the abnormality is recovered, it restarts the CTI process using the personal computer 3A.

Next, the operations of the system having the above structure will be described.

First, a case where the data terminal connected to the LAN 2 makes data communication in the Internet will be explained.

It is assumed now that, for example, a user may operate the data terminal PC1 to make a data communication with a desired counterpart in the Internet IN. The data terminal PC1 transmits a connect message to the main key telephone apparatus 1A on the basis of the TCP/IP (transmission control protocol/internet protocol). This connect message is received by the router unit 14A of the main key telephone apparatus 1A via the LAN 2.

After receiving the connect message, the router unit 14A executes the steps to set a communication connection based on the PPP connection with the counterpart terminal connected in the Internet IN. As for the connection in the ISDN line, the steps of setting the communication connection are executed in the ISDN public network NW via the control bus 20 and office line interface unit 11 in the main key telephone apparatus 1A. That is, the office line interface unit 11 is used originally to make connection between the extension line terminals T1–Tm of key telephones and the ISDN public network NW, but in the present embodiment it is also used to make connection between the router unit 14A and the ISDN public network NW. The connection steps concerning the Internet are executed with a provider (not shown) via the PCM bus 19 and office line interface unit 11 in the main key telephone apparatus 1A and the ISDN public network NW.

In the above steps of setting the communication connection, the router unit 14A transmits a connect message to the counterpart terminal in the Internet IN on the basis of the TCP/IP. In response to the transmission of the connect message, the process of setting the TCP/IP connection is executed between the originating data terminal PC1 and the Internet IN. With this process, the communication connection is set between the originating internal data terminal and the counterpart terminal in the Internet IN, and after this, the data communication in the Internet IN can be made between the data terminal PC1 and the counterpart terminal.

Next, the operations in the communication using the CTI personal computer 3A will be explained.

It is assumed now that, for example, the data communication may be executed between the extension line terminal T1 and an office line terminal connected to the ISDN public network NW. In this case, a digital voice signal transmitted from the extension line terminal T1 is received by the line interface unit 13, transferred to the computer connecting interface unit 16A via the voice bus 19, an transmitted from the computer connecting interface unit 16A to the CTI personal computer 3A. In this CTI personal computer 3A, the digital voice signal is compressed and encoded. This encoded digital voice signal transmitted back from the CTI personal computer 3A to the computer connecting interface unit 16A, transferred from the computer connecting interface unit 16A to the office line interface unit 11 via the voice bus 19, and then transmitted to the office line terminal of the communication counterpart in the ISDN public network NW. The voice signal transmitted from the office line terminal is transferred to the extension line terminal T1 in the path which is reverse to the above path.

Figure 6:
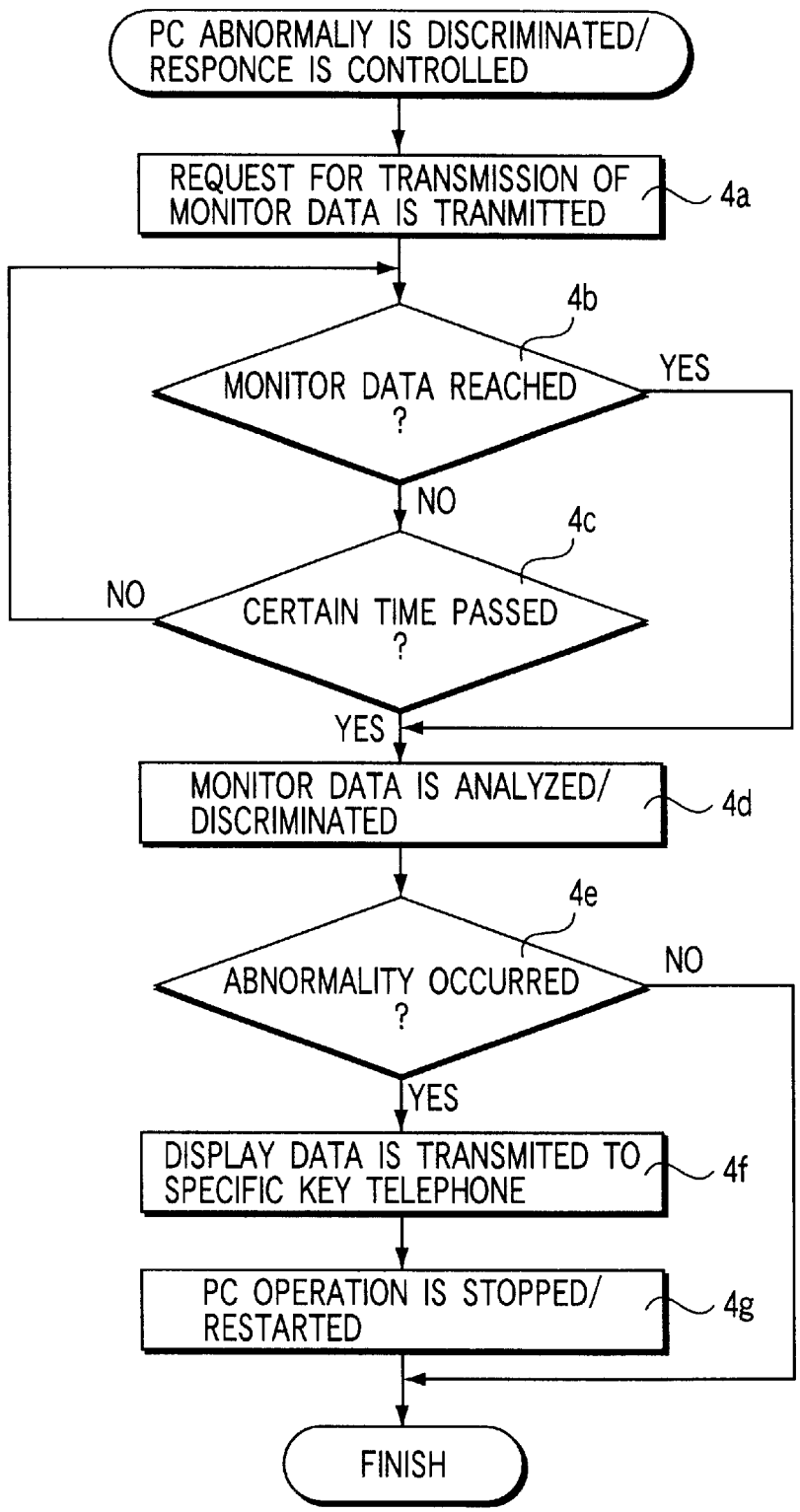
FIG. 6 is a flow chart showing a process and contents of discriminating PC abnormality and controlling the correspondence thereto by means of a controller of a main key telephone apparatus.

Incidentally, in the system of the present embodiment, the following discrimination of abnormality, and response and control thereof are executed in CTI personal computer 3A during such execution of the CTI. FIG. 6 is a flow chart showing the steps and contents of the control.

That is, in the CTI personal computer 3A, the temperature in the cabinet and the operated state of the cooling fan, the temperature of the PC power supply unit 34 and the operating power supply voltage Vcc, and the CPU temperature in the PC control unit 31 and the operated state of the CPU cooling fan, are detected and collected in the condition monitoring unit 331 of the key telephone connecting interface unit 33. The collected monitoring data are stored in the condition monitoring unit 331.

The main key telephone apparatus 1A periodically generates a request for transmission of the monitoring data at the central control unit 17 and transmits the request from the computer connecting interface unit 16A to CTI personal computer 3A (step 4*a*). When the request reaches the CTI personal computer 3A of the key telephone connecting interface unit 33, the CTI personal computer 3A reads and encodes the latest one of the stored monitoring data, and transmits it to the main key telephone apparatus 1A.

After transmitting the request for transmission of the monitoring data, the central control unit 17 of the main key telephone apparatus 1A monitors the arrival of the monitoring data from the CTI personal computer 3A at step 4*b* while monitoring the procedure of the time at step 4*c*. If the monitoring data reaches within a certain time after transmitting the request, the received monitoring data is analyzed at step 4*d*, and it is discriminated on the basis of the results of analysis whether or not abnormality occurs in the CTI personal computer 3A, at step 4*e*. If no abnormality occurs, the control is finished and returns to step 4*a*, and the above control of the discrimination of abnormality is repeated.

On the other hand, it is assumed now that any abnormality may occur in the CTI personal computer 3A. In this case, the central control unit 17 of the main key telephone apparatus 1A transmits abnormality display data to a specific extension line terminal (for example, Tm) which is a key telephone at step 4*f* and allows the data to be displayed. The abnormality display data, which is edited on the basis of the monitoring data transmitted from the CTI personal computer 3A so that the user can easily recognize the contents of the abnormality, is constituted by, for example, a mark representing the kind of the abnormality and a brief explanation.

The abnormality display data may be displayed visually or occurrence of the abnormality may be announced with a voice message by taking advantage of a voice synthesizing means. The extension line terminal Tm displaying the data may be a key telephone or a relay station.

After transmitting the abnormality display data, the central control unit 17 of the main key telephone apparatus 1A transfers to step 4*g* and transmits an order to stop the operation to the CTI personal computer 3A so that the CTI process can be stopped.

On the other hand, for example, if the operating system or the program runs away in the CTI personal computer 3A, the CTI personal computer 3A does not transmit the monitoring data even when the main key telephone apparatus 1A transmits the request for transmission of the monitoring data to the CTI personal computer 3A. In this case, after transmitting the request, the central control unit 17 of the main key telephone apparatus 1A transfers from step 4*c* to step 4*d* after a certain time has passed, then discriminates that the malfunction of the operating system or program has occurred from the fact that the monitoring data does not reach, and transmits the display data representing the discrimination result to a specific extension line terminal Tm and allows the data to be displayed.

When a certain time has passed after the display data to display the occurrence of abnormality is transmitted, the central control unit 17 transmits an order of restart to the CTI personal computer 3A and allows the computer to be restarted. Thus, the CTI personal computer 3A returns to the normal condition.

As described above, in the first embodiment, the router unit 14A is built in the main key telephone apparatus 1A, the ISDN office line interface function and the independent power supply function are removed from the router unit 14A, and these functions are implemented by the office line interface units 11 and 12 and the power supply unit 18 that are already provided in the main key telephone apparatus 1A. That is, the router unit 14A employs the existing office line interface units 11 and 12 and the existing power supply unit 18.

Therefore, the LAN can be included in the key telephone system without preparing the router separately. In addition, the main key telephone apparatus 1A serving as a highly reliable multimedia information communication system can be constituted with a comparatively simple and small structure, not by simply providing the router inside the main key telephone apparatus 1A, but by realizing the office line interface function and the power supply function of the functions necessary for the router by taking advantage of the office line interface units 11 and 12 and the power supply unit 18 that are already provided in the main key telephone apparatus 1A.

In addition, since the interface functions including the protocol converting function to connect the router unit 14A directly to the voice bus 19 and the control bus 20 in the main key telephone apparatus 1A are provided in the bus I/F unit 142 of the router unit 14A, the interface functions between the main key telephone apparatus and the router device, which have been required in the prior art, do not need to be provided.

Moreover, in the first embodiment, abnormality in the CTI personal computer 3A is detected and necessary measures responding to the abnormality are taken by detecting the temperature in the cabinet and the operated state of the cooling fan, the temperature of the PC power supply unit 34 and the operating power supply voltage Vcc, and the CPU temperature in the PC control unit 31 and the operated state of the CPU cooling fan, in the CTI personal computer 3A, transferring these monitor data to the main key telephone apparatus 1A and analyzing them.

Therefore, as the CTI personal computer 3A, an expensive computer such as a server or a factor computer which is designed with high reliability to prevent abnormality from influencing the entire branch exchange system is not required, and a cheap and generally used personal computer can be used.

In addition, the transfer of the monitor data from the CTI personal computer 3A to the main key telephone apparatus 1A is executed in response to the request for transmission from the main key telephone apparatus 1A. If the main key telephone apparatus 1A cannot receive the monitor data even after a certain time has passed, the main key telephone apparatus 1A discriminates that the malfunction of the program or the OS has occurred in the CTI personal computer 3A and causes the CTI personal computer 3A to be restarted. For this reason, the presence of the malfunction in the CTI personal computer 3A can be discriminated in the main key telephone apparatus 1A when the received monitor data is analyzed, and therefore, the main key telephone apparatus 1A can immediately respond to the malfunction in the CTI personal computer 3A.

Furthermore, when abnormality in the CTI personal computer 3A is detected on the basis of the analysis of the monitor data, the main key telephone apparatus 1A generates the display data representing the contents of the abnormality, transmits it to a specific extension line terminal Tm and allows the data to be displayed. As a result, for example, the condition of the operational abnormality in the CTI personal computer 3A can be informed to a person who maintains and uses the system and, therefore, a quick and certain response to the abnormality in the operations of the CTI personal computer 3A, such as a maintenance call and the like, can be made.

(Second Embodiment)

In the second embodiment of the present invention, the CTI personal computer is also connected to the router unit via the LAN which is connected to the router unit, in the main key telephone apparatus, so that the data transmitted from the CTI personal computer can be communicated in the Internet.

Figure 7:
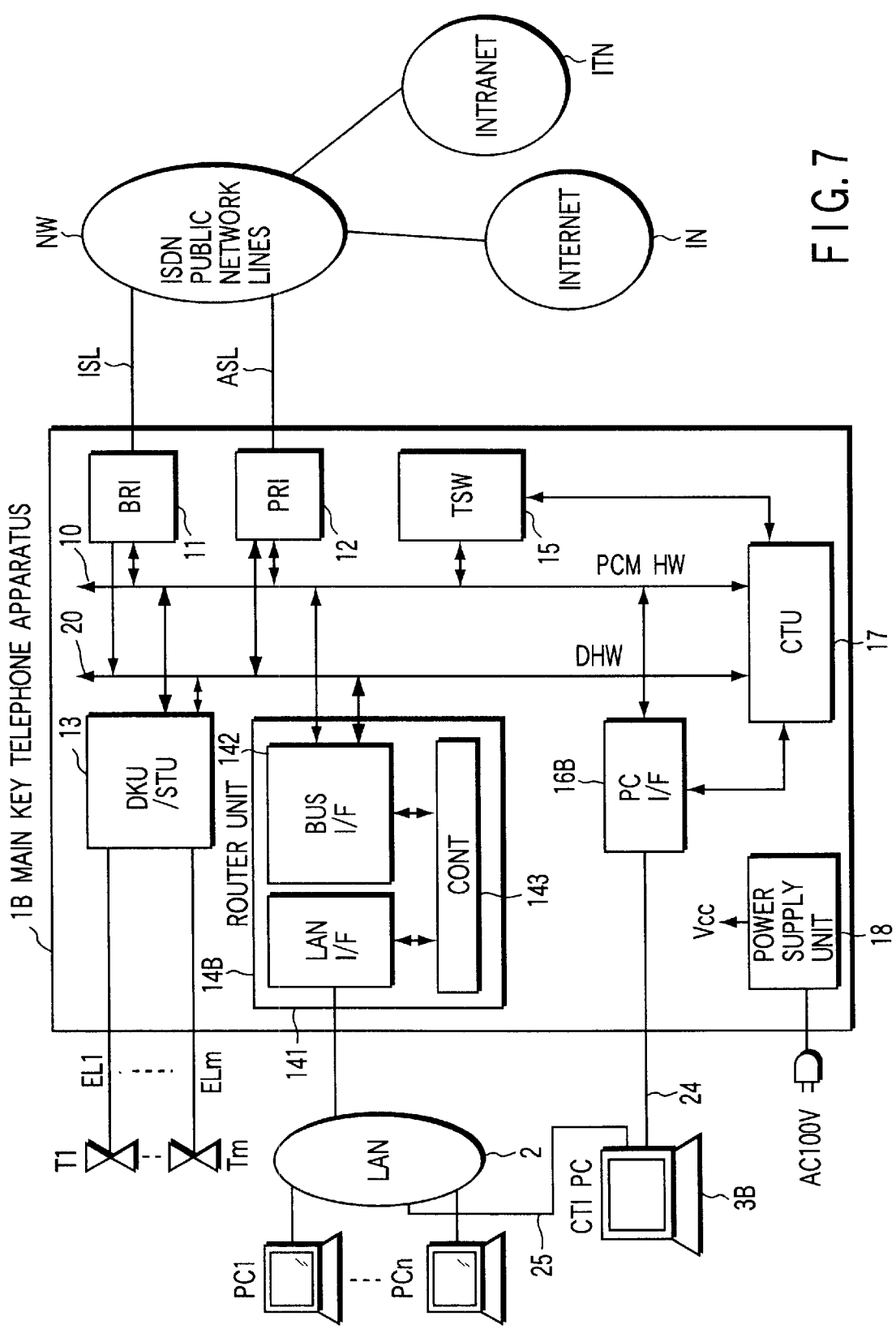
FIG. 7 is a circuit block diagram illustrating a second embodiment of the digital key telephone system according to the present invention.

FIG. 7 is a circuit block diagram illustrating a structure of the digital key telephone system according to the second embodiment. In this figure, the same portions as those shown in FIG. 1 are indicated by the same reference numerals and their detailed explanations are omitted.

In a computer connecting interface unit (PC I/F) 16B provided in a main key telephone apparatus 1B, an internal interface function of transferring the data with other circuit units in the main key telephone apparatus 1B, and a computer interface function of transmitting the data with a CTI personal computer (CTI PC) 3B, are provided.

In this structure, for example, if a voice packet for the extension line terminal T1 reaches via the Internet IN and the ISDN public network NW, the voice packet is received by the office line interface unit 11, input to a router unit 14B via the voice bus 19, transmitted from the router unit 14B to the CTI personal computer 3B via the LAN 2 and a cable 25, and stored in the CTI personal computer 3B as, for example, a voice mail.

When the voice packet is transmitted to the extension line terminal T1, it is decoded at the CTI personal computer 3B, and transmitted to the computer connecting interface unit 16B of the main key telephone apparatus 1B via a computer connecting interface 24. The voice packet is transmitted from the computer connecting interface unit 16B to the line interface unit 13 via the voice bus 19 and the time switch 15, and then transmitted from this line interface unit 13 to the destination extension line terminal T1.

In addition, when the voice data is transmitted from the extension line terminals T1–Tm to the Internet IN as an IP packet, it is transmitted to Internet IN in a course reverse to the above-described one. That is, the voice data transmitted from the extension line terminals is transferred from the computer connecting interface unit 16B to the CTI personal computer 3B in which the voice data is encoded. The voice data is converted to a packet in the CTI personal computer 3B on the basis of the TCP/IP, then transferred to the router unit 14B, and transmitted from this router unit 14B to the ISDN public network NW via the office line interface unit 11.

As described above, according to the second embodiment, the CTI personal computer 3B can be connected to the router unit 14B via the LAN2 and the LAN cable 25 and, as a result, an internet telephone or a facsimile communication via the Internet can be executed by using the extension line terminals T1–Tm. In addition, if any problem occurs in one of the courses, the CTI process can be continued by using another course.

(Third Embodiment)

According to a third embodiment of the present invention, in a digital key telephone system which does not use the CTI personal computer, the PCM processing unit is provided in the main key telephone apparatus 1C, the voice encoding and decoding are executed in the PCM processing unit instead of the CTI personal computer, and the LAN interface function is provided in the PCM processing unit, so that the PCM processing unit can be connected to a router unit 14C via an internal LAN cable 21 by this function.

Figure 8:
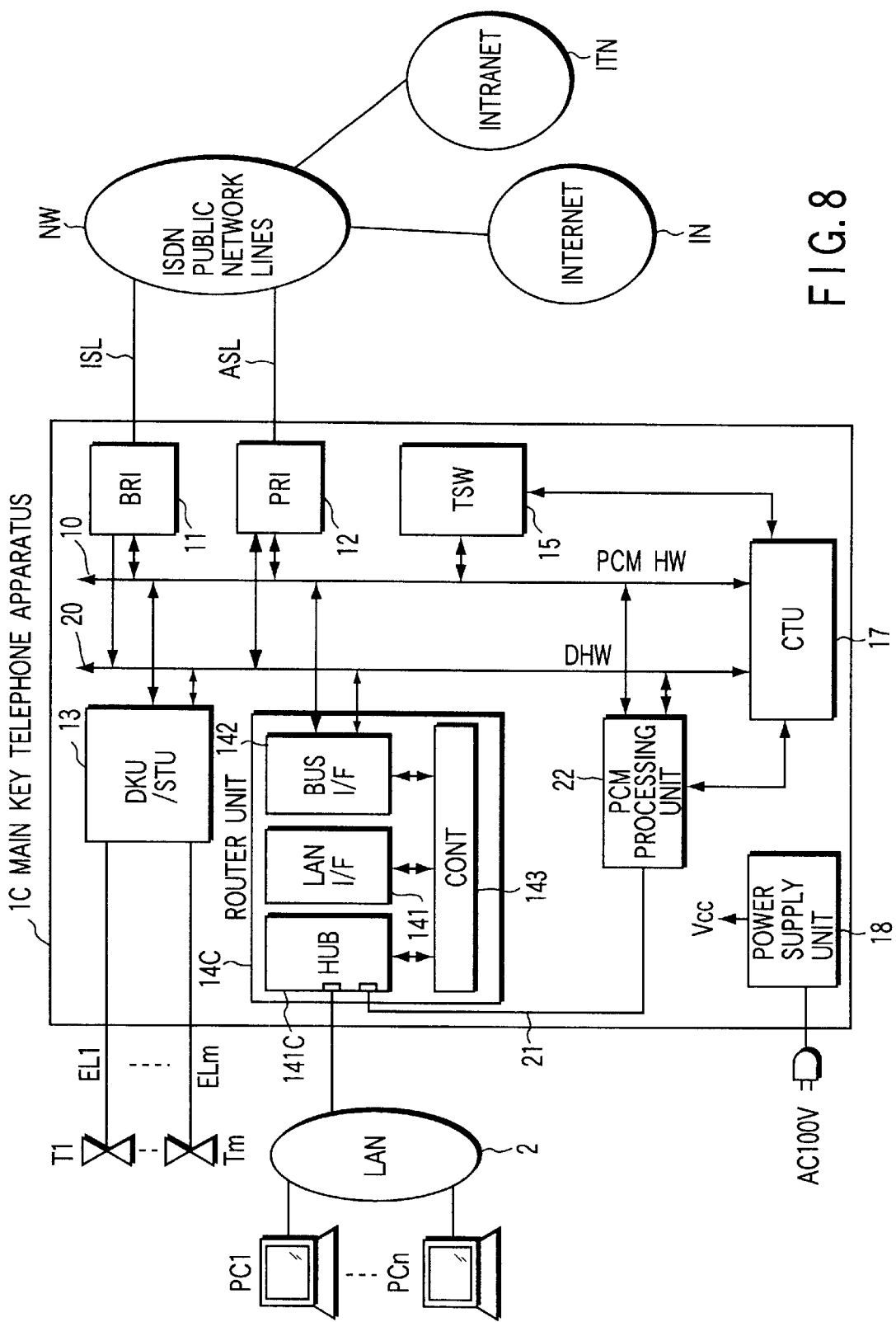
FIG. 8 is a circuit block diagram illustrating a third embodiment of the digital key telephone system according to the present invention.

FIG. 8 is a circuit block diagram illustrating a digital key telephone system according to the third embodiment of the present invention. In this figure, the same portions as those of FIGS. 1 and 4 are indicated by the same reference numerals, and their detailed explanations are omitted.

A hub 141C is built in a router unit 14C.

A PCM processing unit 22 is formed of, for example, a DSP (digital signal processor) board and has a telephony gateway function including a PCM encoding function and a connection protocol function (H.322) to the LAN, and a facsimile service function including a facsimile modem function, a file converting function and a file management function. The PCM processing unit 22 is connected to a router unit 14C via an internal LAN cable 21 for 10BASE-T.

With this structure, the data, which is to be transmitted between the extension line terminals T1 to Tm and the Internet IN is subjected to the process relating to the working of the IP packet as well as the encoding and decoding processes in the PCM processing unit 22, is transmitted to the Internet IN via the router unit 14C and the office line interface units 11 and 12.

Therefore, the internet telephones of the extension line terminals T1 to Tm and the facsimile communication using the Internet IN can be made in the completely similar manner to that of the second embodiment, without connection to the CTI personal computer.

(Fourth Embodiment)

In the CTI personal computer, according to a fourth embodiment of the present invention, the condition monitoring unit which is provided in the key telephone connecting interface of aforementioned embodiments is provided independently as an RAS (reliability, availability and serviceability) function unit, so that the temperature inside the CTI personal computer and the operated condition of the cooling fan are monitored by the RAS function unit and the monitor data is transferred from the key telephone connecting interface to the main key telephone apparatus 1A.

FIG. 9 is a circuit block diagram illustrating the structure of the digital key telephone system according to the fourth embodiment of the present invention. In this figure, the same portions as those of FIG. 4 are indicated by the same reference numerals, and their detailed explanations are omitted.

An RAS function unit 39 is provided in a CTI personal computer 3E, separately from a key telephone connecting interface unit 33E. The RAS function unit 39, which corresponds to the condition monitoring unit 331 in FIG. 5, takes and stores the monitoring information of the cabinet interior cooling fan monitoring unit 37, the temperature detection information of the cabinet interior temperature sensor 38, the monitoring information of the operating power supply voltage Vcc, the temperate detection information of the temperature sensor 343 in the PC power supply unit 34, the temperate detection information of the CPU temperature sensor 313 and the monitoring information of the CPU cooling fan monitoring unit 314. The latest monitoring information is read just when a request for transmission of the monitoring data reaches from the main key telephone apparatus 1A, and is transferred to a key telephone connecting interface unit 33E as the condition monitoring data. The key telephone connecting interface unit 33E transfers the condition monitoring data from the data transmitting unit 332 to the main key telephone apparatus 1A.

With this structure, the physical data can be converted to the logical data in the RAS designing unit, so that the amount of the transmitting data can be reduced and burden on a transmission path and the central control unit 17 can be reduced.

(Fifth Embodiment)

According to a fifth embodiment of the present invention, in a main key telephone apparatus 1E, the monitoring data analyzing and discriminating function which is provided in the central control unit of aforementioned embodiments is provided independently as a PC condition monitoring unit 23, and the condition monitoring data reaching from the CTI personal computer 3A is analyzed by the PC condition monitoring unit 23 so as to discriminate the presence of the operational abnormality.

FIG. 10 is a circuit block diagram illustrating a structure of the main key telephone apparatus 1E according to the fifth embodiment of the present invention. In this figure, the same portions as those of FIG. 4 are indicated by the same reference numerals, and their detailed explanations are omitted.

The PC condition monitoring unit 23 is provided independently of a central control unit 17E, in the main key telephone apparatus 1E. The condition monitoring data transferred from the CTI personal computer 3A is received by a computer connecting interface unit 16E and then input to the PC condition monitoring unit 23. The PC condition monitoring unit 23 analyzes the condition monitoring data and discriminates whether or not the cooling fan of the CTI personal computer 3A is stopped, the temperature rises abnormality, or abnormality occurs in the operational power supply voltage Vcc. The results of the discrimination are input to the central control unit 17E.

If the PC condition monitoring unit 23 detects the abnormality, the central control unit 17E generates data representing the contents of the abnormality, transmits it to the specific extension line terminal Tm and allows it to be displayed. When a stop ordering command reaches from the specific extension line terminal Tm, the computer connecting interface unit 16E transmits an operation stopping order to the CTI personal computer 3A in accordance with the command so that the operations of the CTI personal computer 3A are stopped. If the command of the operation stopping order does not reach in a certain time after the transmission of the display data, the central control unit 17E voluntarily generates the operation stopping order, transmits it to the CTI personal computer 3A and allows the operation to be stopped.

With this structure, the PC condition monitoring unit 23 is provided in the main key telephone apparatus 1E so that the monitoring data can be analyzed and abnormality can be discriminated in the monitoring unit 23 and, therefore, the burden on the central control unit 17E can be reduced.

(Sixth Embodiment)

According to the sixth embodiment, in a main key telephone apparatus IF, the monitor data analyzing and discriminating function which is provided in the central control unit of aforementioned embodiments is provided independently as the PC condition monitoring unit 23, and the condition monitoring data reaching from the CTI personal computer 3A is analyzed by the PC condition monitoring unit 23 to discriminate the presence of the operational abnormality. Further, if the abnormality in the operation of the branch exchanger is detected, the computer is set in a waiting state until the initialization of the exchanger has been completed and the operated state of the exchanger is initialized, and after the initialization has been finished, the waiting state of the computer is released to restart the computer.

Figure 11:
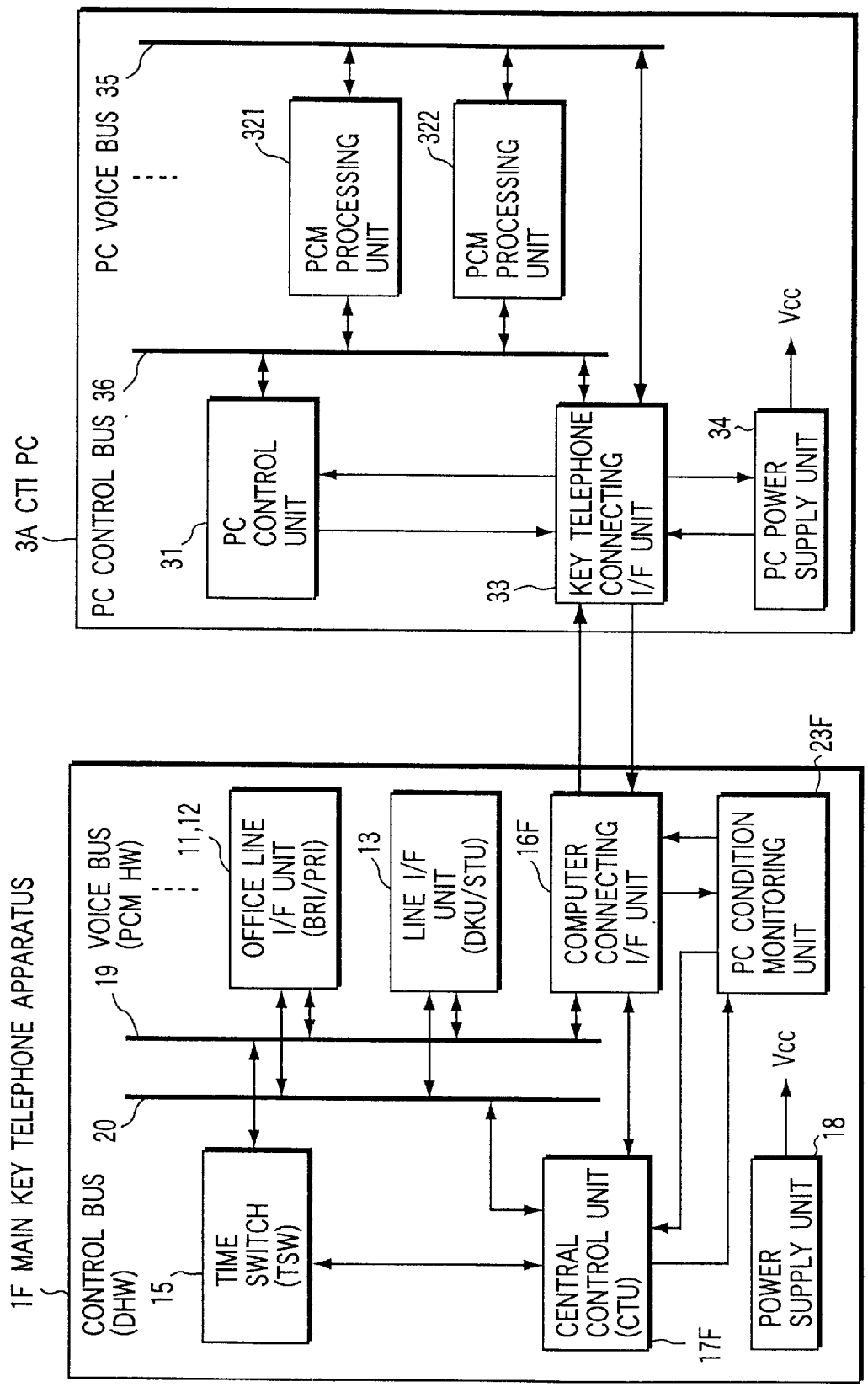
FIG. 11 is a block diagram illustrating essential units of a sixth embodiment of the digital key telephone system according to the present invention.

FIG. 11 is a circuit block diagram illustrating the structure of the main key telephone apparatus 1F according to the sixth embodiment of the digital key telephone system. In this figure, the same portions as those of FIG. 10 are indicated by the same reference numerals, and their detailed explanations are omitted.

In the main key telephone apparatus 1F, a PC condition monitoring unit 23F is provided independently of a central control unit 17F. The condition monitor data transferred from the CTI personal computer 3A is received by a computer connecting interface unit 16F and then input to the PC condition monitoring unit 23F. The PC condition monitoring unit 23F analyzes the condition monitor data and discriminates whether or not the cooling fan of the CTI personal computer 3A is stopped, the temperature rises abnormality, or abnormality occurs in the operational power supply voltage Vcc. The results of the discrimination are input to the central control unit 17F.

When the abnormality in the CTI personal computer 3A is detected by the PC condition monitoring unit 23F, the central control unit 17F generates the data representing the contents of the abnormality, transmits it to a specific extension line terminal Tm and allows it to be displayed. When the stop order command reaches from the specific extension line terminal Tm, the computer connecting interface unit 16F transmits an order to stop the operation to the CTI personal computer 3A in accordance with the command, so as to stop the operation of the CTI personal computer 3A. If the order command to stop the operation does not reach within a certain period after transmission of the display data, the central control unit 17F voluntarily generates the operation stop order, and transmits it to the CTI personal computer 3A to stop the operation of the CTI personal computer 3A.

In addition, If the abnormality in the main key telephone apparatus 1F is detected, the central control unit 17F generates the data representing the contents of the abnormality, transmits it to a specific extension line terminal Tm and allows it to be displayed. Then, the central control unit 17F inputs the reset condition information to the PC condition monitoring unit 23F. In response to the reset condition information, the PC condition monitoring unit 23F transmits a wait order to the CTI personal computer 3A via the computer connecting interface unit 16F, and thereby sets the CTI personal computer 3A in a waiting state. After this, the central control unit 17F initializes the operated state of the main key telephone apparatus 1F, and inputs the reset release information to the PC condition monitoring unit 23F after the initialization has been finished. In response to the reset release information, the PC condition monitoring unit 23F transmits a release order to the CTI personal computer 3A via the computer connecting interface unit 16F, and thereby releases the waiting state of the CTI personal computer 3A. The central control unit 17F generates data of erasing the display of abnormality in the main key telephone apparatus 1F, transmits it to a specific extension line terminal Tm, and thereby erases the display of abnormality.

With this structure, the burden on the central control unit 17F can be reduced, similarly to the fifth embodiment. In addition, even when abnormality occurs in the main key telephone apparatus 1F, the operation of the main key telephone apparatus 1F can be recovered without giving bad influence to the operation of the CTI personal computer 3A.

(Other Embodiments)

The present invention is not limited to the above-described embodiments. For example, the digital key telephone system has been explained in the embodiments. However, the present invention can be applied to the digital private branch exchange system. In addition, the kind of the extension terminals, the structure of the main key telephone apparatus, the structure of the router unit, the functions of the central control unit, the structure and connection of the CTI personal computer, and the like can be variously modified within a range which does not exceed the inventive scope of the present invention.

As described above, in the present invention, the router unit for connection of the local area network is built in the exchanger, this router unit has the only interface function with the local area network, and the office line interface and the power supply unit which have been provided in the exchanger are used as the office line interface and the power supply unit which are to be generally provided in the router.

Therefore, according to the present invention, the router unit does not need to be provided separately from the exchanger. In addition, the route unit of the present invention is not only built in the exchanger, but also the office line interface and the power supply unit which have been provided in the exchanger are used as the office line interface and the power supply unit which are to be provided in the router unit. As a result, a system which is of high reliability, a comparatively small size and low manufacturing costs, can be provided.

According to the present invention of the other embodiments, when there is abnormality in the operations of the computer or malfunction in the program, the conditions are discriminated by the exchanger to disconnect or reset the computer.

Therefore, the abnormality in the operations of the computer does not influence the exchanger and, as a result, the system down can be preliminarily prevented and thereby the reliability of the system can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multimedia private branch exchanger, comprising:
    a line interface unit for being capable of connecting a plurality of extension lines and having a function of controlling communication with telephone terminals to be connected to said extension lines;
    a router unit for being capable of connecting a local area network and having a function of controlling communication with data terminals to be connected to said local area network;
    an office line interface unit being provided commonly to said line interface unit and said router unit, for being capable of connecting an external communication network and having a function of controlling communication with said external communication network; and
    a switching unit for selectively connecting said line interface unit and said router unit to said office line interface unit, on the basis of a request for setting a call.

2. A multimedia private branch exchanger according to claim 1, further comprising a power supply unit provided commonly to said line interface unit, said router unit, said office line interface unit and said switching unit, for supplying to each of said units power necessary for their respective operations.

3. A multimedia private branch exchanger according to any one of claims 1 or 2, wherein said router unit comprises a protocol converting unit for connecting said data terminals directly to said office line interface unit.

4. A multimedia private branch exchanger according to claim 1, wherein a hub for being capable of connecting a plurality of local area networks or data terminal devices is built in said router unit.

5. A multimedia private branch exchanger according to claim 1, wherein said router unit is composed of a router card attachable to and detachable from said multimedia private branch exchanger.

6. A multimedia private branch exchanger, comprising:
   a line interface unit for being capable of connecting a plurality of extension lines and having a function of controlling communication with telephone terminals to be connected to said extension lines;
   a router unit for being capable of connecting a local area network and having a function of controlling communication with data terminals to be connected to said local area network;
   an office line interface unit being provided commonly to said line interface unit and said router unit, for being capable of connecting an external communication network and having a function of controlling communication with said external communication network; and
   a switching unit for selectively connecting said line interface unit and said router unit to said office line interface unit, on the basis of a request for setting a call, thereby selectively enabling a first communication between a telephone terminal and the external communication network and a second communication between a data terminal and the external communication network.

7. A private branch exchange system comprising an exchanger apparatus capable of switching between a plurality of extension lines or switching between an office line and one of the extension lines, and a computer apparatus connected to the exchanger apparatus and executing line switching control in cooperation with the exchanger apparatus,
   the computer apparatus including:
      means for detecting an operating condition of the computer apparatus and accumulating detection results as monitor data; and
      means for reading the accumulated monitor data and sending the read monitor data to the exchanger apparatus upon receipt of a monitor data transmission request sent from the exchanger apparatus,
   the exchanger apparatus including:
      means for generating the monitor data transmission request periodically and transmitting the monitor data transmission request to the computer apparatus;
      means for monitoring an arrival of the monitor data from the computer apparatus, while measuring elapse of time from transmission of the monitor data transmission request;
      means for analyzing monitor data and determining whether or not abnormality occurs based on results of analysis, when the monitor data is received within a predetermined time after transmitting the monitor data transmission request;
      means for restarting or stopping the computer apparatus if the means for analyzing and determining determines that the abnormality has occurred; and
      means for restarting the computer apparatus when the monitor data is not received within the predetermined time after transmitting the monitor data transmission request.

8. A private branch exchange system according to claim 7, wherein the computer apparatus further includes: recovery monitoring means for monitoring recovery conditions of the computer apparatus; and means for informing the exchanger apparatus of recovery monitor results obtained by the recovery monitoring means, and
   the exchanger apparatus further includes recovery receiving means for receiving the recovery monitor results from the computer apparatus; and means for determining a recovered condition based on the recovery monitor results received by the recovery receiving means.

9. A private branch exchange system according to claim 7, wherein the exchanger apparatus further includes means for generating abnormality display data representing contents of abnormality based on the received monitor data and transmitting the abnormality display data to a terminal connected to the extension lines, when analysis of the monitor data received from the computer apparatus shows that abnormality occurs inside the computer apparatus.

10. A private branch exchange system according to claim 7, wherein the exchanger apparatus is connected to a relay station, and the exchanger apparatus further includes means for generating abnormality display data representing contents of abnormality based on the received monitor data and transmitting the abnormality display data to the relay station, when analysis of the monitor data received from the computer apparatus shows that abnormality occurs inside the computer apparatus.

11. A private branch exchange system according to claim 7, wherein the exchanger apparatus further includes means for generating display data representing a malfunction of the computer apparatus and transmitting the display data to a terminal connected to extension lines, when the monitor data is not received within the predetermined time after transmitting the monitor data transmission request.

12. A private branch exchanger apparatus for use in a private branch exchange system comprising a computer apparatus which is connected to the exchanger apparatus and cooperates therewith for line switching control, the computer apparatus detecting an operating condition thereof, accumulating detection results as monitor data, reading the accumulated monitor data and sending the read monitor data to the exchanger apparatus upon receipt of a monitor data transmission request sent from the exchanger apparatus,
   the exchanger apparatus comprising:
      means for generating the monitor data transmission request periodically and transmitting the monitor data transmission request to the computer apparatus,
      means for monitoring an arrival of the monitor data from the computer apparatus, while measuring elapse of time from transmission of the monitor data transmission request;
      means for analyzing received monitor data and determining whether or not abnormality occurs based on results of analysis, when the monitor data is received within a predetermined time after transmitting the monitor data transmission request;
      abnormality control means for restarting or stopping the computer apparatus if the means for analyzing and determining determines that the abnormality has occurred; and
      restarting means for restarting the computer apparatus when the monitor data is not received within the predetermined time after transmitting the monitor data transmission request.

13. A private branch exchanger apparatus according to claim 12, further comprising: recovery receiving means for receiving recovery monitor results representing an abnormality-recovered condition from the computer apparatus, and recovery determination means for determining a recovered condition based on the recovery monitor results received by the recovery receiving means.

14. A private branch exchanger apparatus according to claim 12, further comprising:
 means for generating abnormality display data representing contents of abnormality based on the received monitor data and transmitting the abnormality display data to a terminal connected to extension lines, when analysis of the monitor data received from the computer apparatus shows that abnormality occurs inside the computer apparatus.

15. A private branch exchanger apparatus according to claim 12, wherein the exchanger apparatus is connected to a relay station, and which further comprises means for generating abnormality display data representing contents of abnormality based on the received monitor data and transmitting the abnormality display data to the relay station, when analysis of the monitor data received from the computer apparatus shows that abnormality occurs inside the computer apparatus.

16. A private branch exchanger apparatus according to claim 12, wherein the exchanger apparatus further includes means for generating display data representing a malfunction of the computer apparatus and transmitting the display data to a terminal connected to extension lines, when the monitor data is not received within the predetermined time after transmitting the monitor data transmission request.

* * * * *